United States Patent
Meshkati et al.

(10) Patent No.: US 10,136,340 B2
(45) Date of Patent: *Nov. 20, 2018

(54) METHOD AND APPARATUS FOR DETERMINING RF PARAMETERS BASED ON NEIGHBORING ACCESS POINTS

(71) Applicant: QUALCOMM Incorporated, San Diego, CA (US)

(72) Inventors: Farhad Meshkati, San Diego, CA (US); Yeliz Tokgoz, San Diego, CA (US); Mehmet Yavuz, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/779,360

(22) Filed: Feb. 27, 2013

(65) Prior Publication Data

US 2013/0252602 A1    Sep. 26, 2013

Related U.S. Application Data

(60) Provisional application No. 61/606,212, filed on Mar. 2, 2012.

(51) Int. Cl.
*H04M 3/00* (2006.01)
*H04W 24/02* (2009.01)
(Continued)

(52) U.S. Cl.
CPC ............ *H04W 24/02* (2013.01); *H04W 28/16* (2013.01); *H04W 8/22* (2013.01); *H04W 84/045* (2013.01)

(58) Field of Classification Search
CPC ....... H04W 8/22; H04W 28/16; H04W 28/04; H04W 24/02; H04W 24/10; H04W 84/045
(Continued)

(56) References Cited

U.S. PATENT DOCUMENTS 8,032,142 B2 * 10/2011 Carter et al. ................ 455/444
8,126,496 B2   2/2012 Brisebois et al.
(Continued)

FOREIGN PATENT DOCUMENTS

GB    2445988        7/2008
JP    2004511150 A   4/2004
(Continued)

OTHER PUBLICATIONS

International Search Report and Written Opinion—PCT/US2013/028747—ISA/EPO—Oct. 8, 2013.
(Continued)

*Primary Examiner* — Khai M Nguyen
(74) *Attorney, Agent, or Firm* — Haojin Wang

(57) ABSTRACT

Systems and methods are provided for a femto node to configure one or more of its RF parameters. This may be achieved, for example, by determining capabilities of one or more neighboring femto or pico nodes based in part on signals received from the one or more neighboring femto or pico nodes, comparing the determined capabilities of the one or more neighboring femto or pico nodes to one or more capabilities of the femto node, and adjusting one or more RF parameters of the femto node based on the comparison.

32 Claims, 9 Drawing Sheets

(51) Int. Cl.
  *H04W 28/16* (2009.01)
  *H04W 8/22* (2009.01)
  *H04W 84/04* (2009.01)

(58) Field of Classification Search
  USPC ............ 455/418, 436, 411, 435.1, 442, 446;
    370/338, 252, 331, 332
  See application file for complete search history.

(56) References Cited

U.S. PATENT DOCUMENTS

| | | | |
|---|---|---|---|
| 8,285,321 B2 | 10/2012 | Ji et al. | |
| 8,761,826 B2 * | 6/2014 | Brown et al. | 455/522 |
| 2009/0213825 A1 * | 8/2009 | Gupta | H04W 48/02 370/338 |
| 2009/0316649 A1 | 12/2009 | Chen | |
| 2010/0020710 A1 * | 1/2010 | Gupta | H04J 11/0093 370/252 |
| 2010/0029282 A1 * | 2/2010 | Stamoulis et al. | 455/436 |
| 2010/0214943 A1 * | 8/2010 | Immendorf | H04W 24/00 370/252 |
| 2010/0271979 A1 | 10/2010 | Godin | |
| 2010/0317386 A1 * | 12/2010 | Da Silva | H04W 48/08 455/507 |
| 2011/0136494 A1 * | 6/2011 | Kim | H04W 72/0426 455/450 |
| 2011/0256878 A1 | 10/2011 | Zhu et al. | |
| 2011/0310830 A1 * | 12/2011 | Wu | H04W 72/1289 370/329 |
| 2011/0310858 A1 * | 12/2011 | Tokgoz | H04L 5/0048 370/336 |
| 2012/0039265 A1 * | 2/2012 | Patel et al. | 370/329 |
| 2012/0238268 A1 * | 9/2012 | Radulescu | H04W 36/0061 455/435.1 |
| 2012/0252479 A1 | 10/2012 | Morita et al. | |
| 2013/0088986 A1 * | 4/2013 | Xiao | H04W 72/0426 370/252 |
| 2013/0114434 A1 * | 5/2013 | Muruganathan | H04W 16/14 370/252 |
| 2013/0231099 A1 * | 9/2013 | Meshkati | H04W 8/22 455/418 |
| 2013/0252602 A1 * | 9/2013 | Meshkati et al. | 455/422.1 |
| 2013/0286865 A1 | 10/2013 | Johansson et al. | |
| 2014/0064247 A1 * | 3/2014 | Teyeb | H04W 36/0083 370/331 |
| 2014/0301371 A1 | 10/2014 | Maeda et al. | |
| 2015/0117197 A1 | 4/2015 | Radulescu et al. | |
| 2015/0350931 A1 | 12/2015 | Dillinger et al. | |
| 2015/0358959 A1 | 12/2015 | Meshkati et al. | |
| 2016/0006529 A1 | 1/2016 | Yi et al. | |
| 2016/0165461 A1 | 6/2016 | Kaul et al. | |

FOREIGN PATENT DOCUMENTS

| | | |
|---|---|---|
| WO | 0230142 A2 | 4/2002 |
| WO | WO-2009105687 A1 | 8/2009 |
| WO | WO-2014121846 A1 | 8/2014 |

OTHER PUBLICATIONS

ETSI TS 136 300, "LTE; Evolved Universal Terrestrial Radio Access (E-UTRA) and Evolved Universal Terrestrial Radio Access Network (E-UTRAB); Overall description; Stage 2", 3GPP TS 36.300 Version 10.3.0 Release 10, Apr. 2011, 205 Pages, Section 22.4.1.2.1.

* cited by examiner

METHOD AND APPARATUS FOR DETERMINING RF PARAMETERS BASED ON NEIGHBORING ACCESS POINTS

CLAIM OF PRIORITY UNDER 35 U.S.C. §119

The present application for Patent claims the benefit of U.S. Provisional Application No. 61/606,212 entitled "METHOD AND APPARATUS FOR DETERMINING RF PARAMETERS BASED ON NEIGHBORING ACCESS POINTS" filed Mar. 2, 2012, assigned to the assignee hereof, and expressly incorporated herein by reference.

FIELD OF DISCLOSURE

This disclosure relates generally to telecommunications, and more particularly to femto cell base station management and the like.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more robust wireless coverage to mobile devices. For example, low power base stations (commonly referred to as Home Node Bs or Home eNBs, collectively referred to as H(e)NBs, femto nodes, femtocell nodes, pico nodes, micro nodes, etc.) can be deployed for incremental capacity growth, richer user experience, in-building or other specific geographic coverage, and the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc., without consideration of a current network environment.

SUMMARY

Example embodiments of the invention are directed to systems and methods for a low power base station "femto node" to configure one or more of its radio frequency (RF) parameters.

In some embodiments, a method is provided for a femto node to configure one or more of its RF parameters. The method may comprise, for example: determining capabilities of one or more neighboring femto or pico nodes based in part on signals received from the one or more neighboring femto or pico nodes, comparing the determined capabilities of the one or more neighboring femto or pico nodes to one or more capabilities of the femto node, and adjusting one or more RF parameters of the femto node based on the comparison.

In other embodiments, an apparatus is provided for configuring one or more RF parameters of a femto node. The apparatus may comprise, for example, at least one processor configured to: determine capabilities of one or more neighboring femto or pico nodes based in part on signals received from the one or more neighboring femto or pico nodes, compare the determined capabilities of the one or more neighboring femto or pico nodes to one or more capabilities of the femto node, and adjust one or more RF parameters of the femto node based on the comparison. The apparatus may accordingly also comprise, for example, memory coupled to the at least one processor.

In still other embodiments, another apparatus is provided for configuring one or more RF parameters of a femto node. The apparatus may comprise, for example: means for determining capabilities of one or more neighboring femto or pico nodes based in part on signals received from the one or more neighboring femto or pico nodes, means for comparing the determined capabilities of the one or more neighboring femto or pico nodes to one or more capabilities of the femto node, and means for adjusting one or more RF parameters of the femto node based on the comparison.

In still other embodiments, a computer-readable medium is provided comprising code, which, when executed by at least one processor, causes the at least one processor to perform operations for a femto node to configure one or more of its RF parameters. The computer-readable medium may comprise, for example: code for determining capabilities of one or more neighboring femto or pico nodes based in part on signals received from the one or more neighboring femto or pico nodes, code for comparing the determined capabilities of the one or more neighboring femto or pico nodes to one or more capabilities of the femto node, and code for adjusting one or more RF parameters of the femto node based on the comparison.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
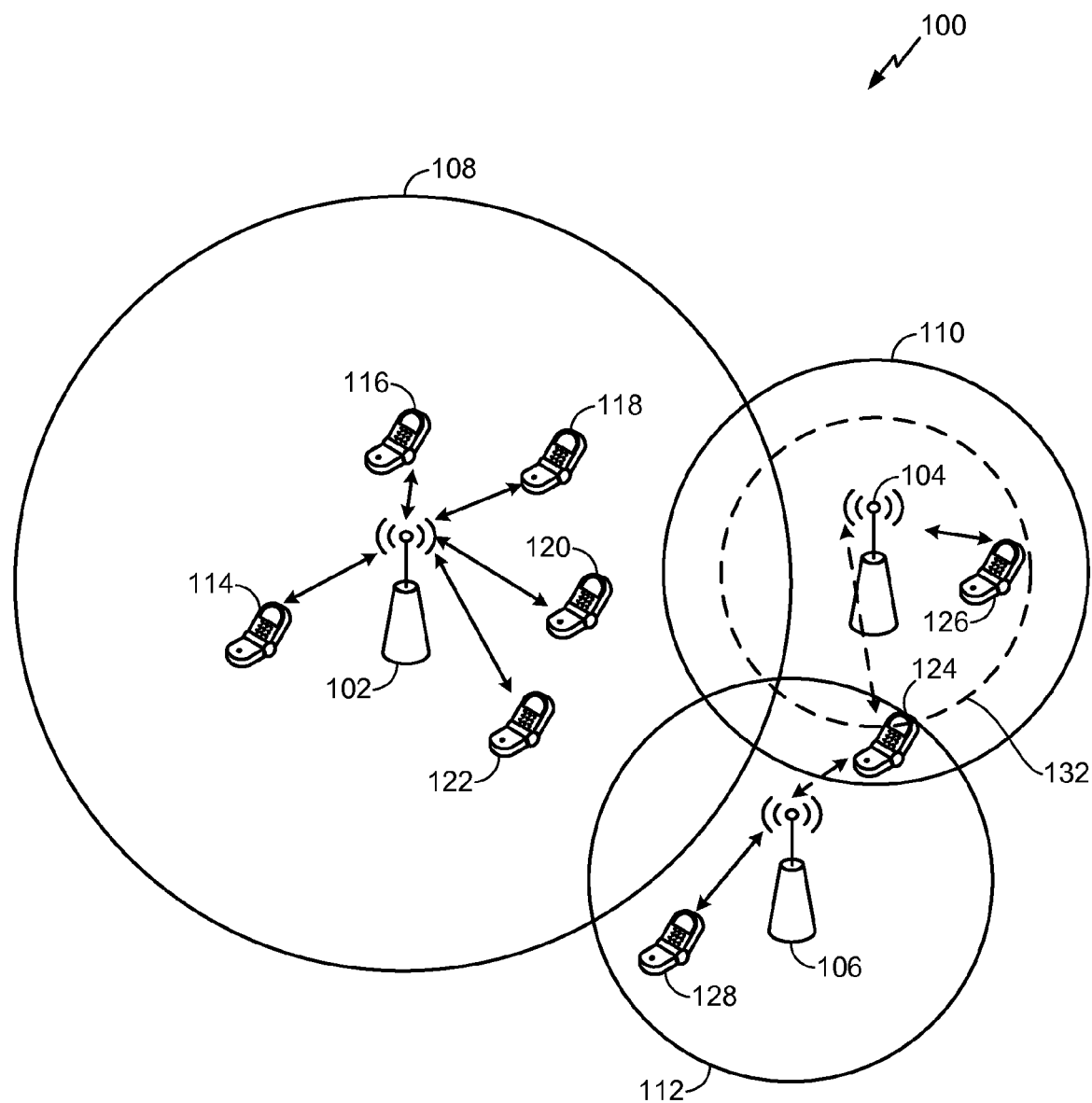
FIG. 1 is a block diagram of an example system that facilitates adjusting radio frequency (RF) parameters of a femto node.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, low power base stations, such as femto nodes, can configure radio frequency (RF) parameters based on observations of neighboring access points. In this regard, the low power base stations can, in effect, cause devices to prefer the low power base station or to instead prefer other access points based on the observations. For example, a low power base station can determine capabilities of the neighboring access points based on one or more measured or otherwise received parameters. In addition, the neighboring access points can use broadcast, backhaul, or other (e.g., user device) signals and related parameters to indicate capabilities, which the low power base station can receive and use to adjust RF parameters. In one example, the low power base station can compare its capabilities to those of the low power base station in configuring the RF parameters. Where a neighboring access point has better capabilities than the low power base station, for example, the low power base station can set RF parameters in an attempt to effectively expand a coverage area of the neighboring access point, and thus cause more devices to be served by the neighboring access point rather than the low power base station.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. In general, a low power base station is referred to as such because it transmits at a relatively low power as compared to a macro base station associated with a wireless wide area network (WWAN). Accordingly, the coverage area of the low power base station is typically substantially smaller than the coverage area of a macro base station.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution, and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Various aspects are also described herein in connection with a base station. A base station may be utilized for communicating with wireless terminal(s) and may also be referred to as an access point, a Node B, evolved Node B (eNB), home Node B (HNB) or home evolved Node B (HeNB), collectively referred to as H(e)NB, or some other terminology.

In general, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc., and/or may not include all of the devices, components, modules etc. discussed in connection with the figures. A combination of these approaches may also be used.

Referring to FIG. 1, an example wireless communication system 100 is illustrated that facilitates expanding coverage of a femto node. System 100 comprises a macro node 102, which can be a macro base station or a femto, pico, or other low power base station node, in one example. System 100 also includes femto nodes 104 and 106, which can be substantially any type of low power base station or at least a portion thereof. The nodes 102, 104, and 106 provide respective coverage areas 108, 110, and 112. System 100 also includes a plurality of devices 114, 116, 118, 120, 122, 124, 126, and 128 that communicate with the nodes 102, 104, or 106 to receive wireless network access.

As described, the femto nodes 104 and 106 can communicate with the wireless network (not shown) over a broadband connection. In addition, femto nodes 104 and 106 can communicate with one another, and/or with macro node 102, over a backhaul connection. The backhaul connection can be, for example, a connection managed through the core wireless network accessible over the broadband connection at the femto node 104 and/or 106, and/or over a connection through a radio network controller (RNC) that communicates with macro node 102. In one example, upon initialization, one or more of the femto nodes 104 and/or 106 can also communicate with one another to form a grouping (e.g., an ad-hoc network). This allows the femto nodes 104 and/or 106 to communicate to determine parameters related to serving the various devices connected thereto (e.g., resource allocations, interference management, and/or the like). Moreover, femto nodes 104 and 106 can automatically configure themselves to operate in the wireless network (e.g., set transmit power, network identifiers, pilot signal resources, and/or the like based on similar information received over a backhaul connection, over-the-air, or otherwise sensed from surrounding nodes). In this example, the femto nodes 104 and 106 can behave as plug-and-play devices requiring little user interaction to be provisioned on the wireless network.

In one example, femto node 104 can observe capabilities of macro node 102 and/or femto node 106 in determining parameters for providing wireless network access. For example, femto node 104 can determine or adjust transmission power, resource block allocation, utilized frequency spectrum, and/or other RF parameters based on determined capabilities of macro node 102, femto node 106, etc. For example, where capabilities of macro node 102, femto node 106, or other nodes are improved at least a threshold amount over those of femto node 104, femto node 104 can reduce transmission power, resource block allocation, etc., to defer more devices to the other nodes. This can improve coverage for the device. For example, where femto node 104 provides coverage area 110, adjusting RF parameters based on measured capabilities of femto node 106 allows femto node 104 to effectively shrink its coverage area to coverage area 132, which causes device 124 to communicate with femto node 106.

For example, femto node 104 can determine a number of channel elements (CE), backhaul capacity, maximum transmission power, a downlink/uplink load metric, preferred users, access mode, etc. of macro node 102 or femto node 106. This information can be obtained from the macro node 102 or femto node 106 in broadcast channel (BCH) messages, or can be embedded at the physical layer (e.g., in a secondary synchronization channel). In other examples, the macro node 102 and/or femto node 106 can utilize other parameters to indicate the information, such as selecting a physical layer attribute (e.g., primary scrambling code (PSC)). In this example, the attribute can correspond to a subset of attribute values related to low capability or another subset related to high capability. Thus, femto node 106 can select an attribute to indicate the desired capability. In any case, femto node 104 can measure broadcast parameters to determine capabilities of macro node 102 and/or femto node 106 (e.g., using a network listening module (NLM) or otherwise receiving capability parameters measured by a device communicating with femto node 104). In the PSC example above, the femto node 104 can use the mapping to determine the capability information based on the PSC. In another example, macro node 102 and/or femto node 106 can communicate capability information to femto node 104 via a backhaul connection, as described.

Femto node 104 can compare the observed capability information to its own capabilities, in one example, to determine an adjustment of transmission power, resource allocation (e.g., allocation of time and/or frequency blocks), frequency spectrum, etc. For example, where femto node 104 determines femto node 106 has more CEs, femto node 104 can decrease transmission power to reduce its coverage area, which makes reselection or handover of devices communicating with femto node 104 more likely (e.g., to femto node 106 or other nodes). It is to be appreciated that femto node 104 can compare multiple measured or otherwise received capabilities of macro node 102 and/or femto node 106 in determining adjustment of its RF parameters. Moreover, it is to be appreciated that a centralized entity can collect capability information of multiple nodes and accordingly specify RF parameters and/or related adjustments, such as transmission power, resource allocation, frequency spectrum, etc., to the nodes based on capabilities. The nodes can set RF parameters based on the RF parameters or related adjustments received from the centralized entity. Moreover, femto node 104 can similarly adjust mobility parameters based on the measured capabilities.

In one example, femto nodes 104 and 106 can operate in an open or hybrid access mode to offload devices from macro node 102. In this example, allowing the femto nodes to specify communication parameters to define a coverage area based on measured capabilities of other nodes provides a self-configuration ability from which the above scenario can benefit. In this regard, devices offloaded from macro node 102 can be directed to femto nodes that provide the best or at least reasonable communication capabilities for the device. In some examples, however, it is to be appreciated that femto nodes operating in a hybrid access mode can prefer member devices to non-member devices.

In addition, parameters can be updated by certain events, such as addition of femto nodes to the network, removal of femto nodes from the network, etc. For example, femto node 104 can detect a new femto node nearby (e.g., based on parameters received by the NLM) that provides improved capabilities, and can further decrease transmission power, etc., to allow the new femto node to provide access to some devices in the area.

Figure 2:
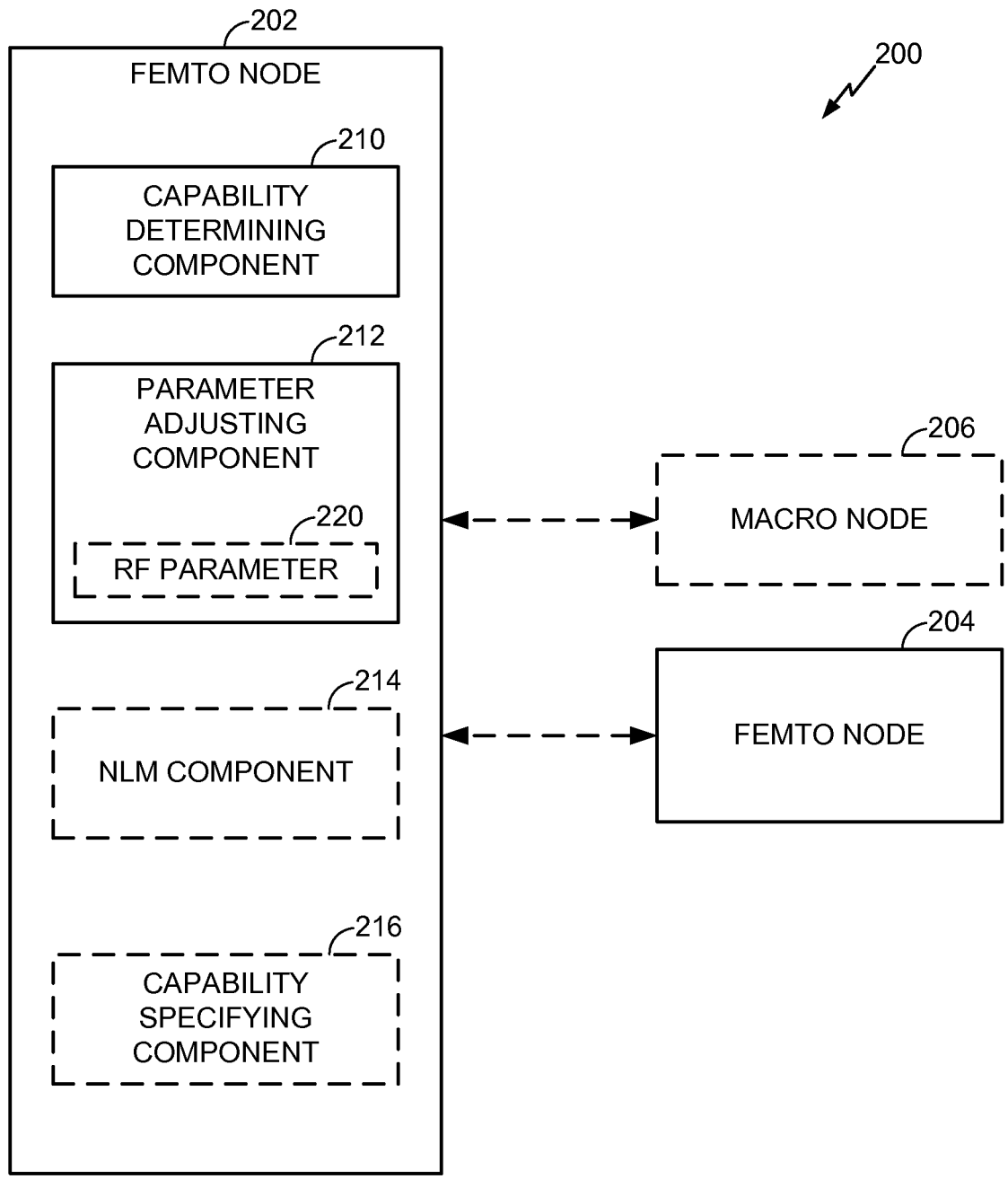
FIG. 2 is a block diagram of an example system that facilitates comparing capabilities of access points to determine RF parameters for a femto node.

FIG. 2 illustrates an example system 200 for adjusting RF parameters of a femto node. System 200 comprises a femto node 202 that can provide wireless network access to one or more devices, as described, as well as a femto node 204 that is near femto node 202. Thus, for example, femto node 202 can be similar to one of femto nodes 104 or 106, and femto node 204 can be similar to another one of femto nodes 104 or 106. In this example, femto nodes 202 and 204 can communicate over a backhaul or optionally through a management server or gateway (e.g., H(e)NB management server (HMS) or H(e)NB gateway (HGW)) to manage parameters related to providing network access to the devices. Moreover, an optional macro node 206 is provided. Macro node 206 can be similar to macro node 102, in one example.

Femto node 202 can include a capability determining component 210 for observing one or more parameters related to capabilities of another access point, and a parameter adjusting component 212 for adjusting one or more RF parameters based in part on the observed capabilities of other access points. Femto node 202 also optionally includes a NLM component 214 for obtaining one or more parameters broadcasted by the access points, and/or a capability specifying component 216 for communicating parameters regarding capabilities of femto node 202 to other access points.

According to an example, femto node 202 can determine RF parameters for communicating in a network given capabilities of femto node 204, macro node 206, or other nodes. This can occur upon initialization of femto node 202 in the wireless network, upon occurrence of one or more detected events—such as addition or removal of an access point in a wireless network, detected load at femto node 202 over a threshold, etc.—based on a timer or command from a core network component, and/or the like. In this example, capability determining component 210 can receive or otherwise determine one or more parameters related to capabilities at femto node 204. This can include capability determining component 210 receiving broadcast parameters from the femto node 204 (e.g., based on decoding signals received therefrom using NLM component 214), receiving parameters over a backhaul connection thereto, receiving parameters from a device communicating with femto node 202 that can receive and/or measure parameters from femto node 204, etc.

The parameters broadcast by femto node 204 or otherwise determined based on information broadcast by femto node 204 can include a number of CEs, backhaul capacity and cost, maximum transmission power, average downlink/uplink load, preferred users, access mode (open/hybrid/closed), etc. In one example, this information can be broadcast by the femto node 204 (e.g., over a BCH or can be embedded at the physical layer, such as by using the secondary synchronization channel). Thus, NLM component 214, for instance, can receive the BCH, and capability determining component 210 can determine the information based on the parameters (e.g., as indicated or otherwise discerned from the parameters). In other examples, devices communicating with femto node 202 can communicate measurement reports to femto node 202 that include parameters of femto node 204 from which capabilities can be determined. Alternatively, femto node 204 can utilize certain physical layer attributes, such as PSCs, to signal capabilities (e.g., low or high maximum transmission power, low or high resource capacity or utilization, etc.), where the physical layer attributes correspond to a range of attribute values indicative of capability information. In this example, the physical layer attributes are received at femto node 202, and capability determining component 210 compares the physical layer attributes to ranges of attribute values that relate to capability information. Based on the comparison, capability determining component 210 can determine capability information related to femto node 204. In other examples, femto node 204 can communicate the capability information to femto node 202 over a backhaul connection.

In any case, capability determining component 210 can interpret received information to determine capabilities of femto node 204. In a specific example, capability determining component 210 can obtain received pilot strength over total received signal power (Ecp/Io) of femto node 204, and can estimate average downlink load at femto node 204 based thereon (e.g., higher Ecp/Io can indicate lower downlink load, etc.). In this example, femto node 202 can receive the Ecp/Io using NLM component 214 or in measurement reports from a connected device. In another example, capability determining component 210 can estimate the average uplink load at femto node 204 in part by decoding an uplink interference level broadcast by femto node 204 (e.g., higher uplink interference can indicate higher uplink load, etc.). It is to be appreciated that capability determining component 210 can observe additional or alternative parameters, and can compare the parameters to those of femto node 202.

Parameter adjusting component 212 can adjust RF parameters of femto node 202, such as RF parameter 220, based on the comparison of capabilities of femto node 204 to those of femto node 202. For example, once femto node 202 becomes aware of the capabilities of femto node 204 (e.g., and/or macro node 206 or other neighboring nodes), capability determining component 210 can compare the capabilities of the femto node (and/or other access points) with its own capabilities, and parameter adjusting component 212 can adjust RF parameters 220 of femto node 202, such as transmission power, resource allocation, frequency spectrum, etc., to try to maximize the user experience at one or more devices. RF parameter 220 can be used by a transmitter or other component of femto node 202 to communicate in a wireless network.

For example, where one or more neighboring access points, such as femto node 204, have improved capabilities over femto node 202 (e.g., more CEs, better backhaul throughput, lower average load, operation in an open mode where femto node 202 operates in a hybrid mode, etc.), the parameter adjusting component 212 can adjust the RF parameters (e.g., transmission power, number of frequency and/or time resource blocks, frequency spectrum, etc.) to make it more likely for devices to be served by the one or more neighboring access points, such as femto node 204. For example, where parameter adjusting component 212 reduces transmission power, coverage area of the femto node 202 is effectively reduced, thus making it more likely for devices to reselect or handover to a neighboring access point, such as femto node 204.

As another example, femto node 202 can be backhaul limited. For example, this can be due to a constrained broadband internet connection caused by preferring other devices on the network. In other examples, femto node 202 can prefer traffic from member devices, which can cause backhaul limitation for non-member devices. In these examples, capability determining component 210 can determine that other neighboring access points may have backhauls with increased throughput (e.g., based on receiving parameters related to the backhaul throughput, based on determining that the other neighboring access points operate in an open access mode, etc.). In this example, parameter adjusting component 212 can reduce the number of frequency/time blocks or amount of frequency spectrum allocated to femto node 202 so that more resources become available to the neighboring access points with the better backhaul.

In addition, for example, capability specifying component 216 can communicate capability information related to femto node 202 to other access points. For example, capability specifying component 216 can broadcast capabilities in one or more overhead messages. In one example, this can include explicit indication of capabilities, indication using one or more other parameters, such as PSC to indicate information based on comparing the PSC to one or more ranges of PSC values as described, etc. In another example, capability specifying component 216 can communicate the information over a backhaul to one or more access points, such as femto node 204, macro node 206, etc.

Moreover, it is to be appreciated that femto node 202 can be a centralized entity, such as a HNB gateway, HMS, etc., that collects or otherwise determines capability information of various femto nodes as described. In this example, parameter adjusting component 212 can adjust RF parameters for the various femto nodes and communicate the adjusted RF parameters to the femto nodes. The femto nodes can receive the RF parameters and accordingly adjust RF parameters based on those received.

Figure 3:
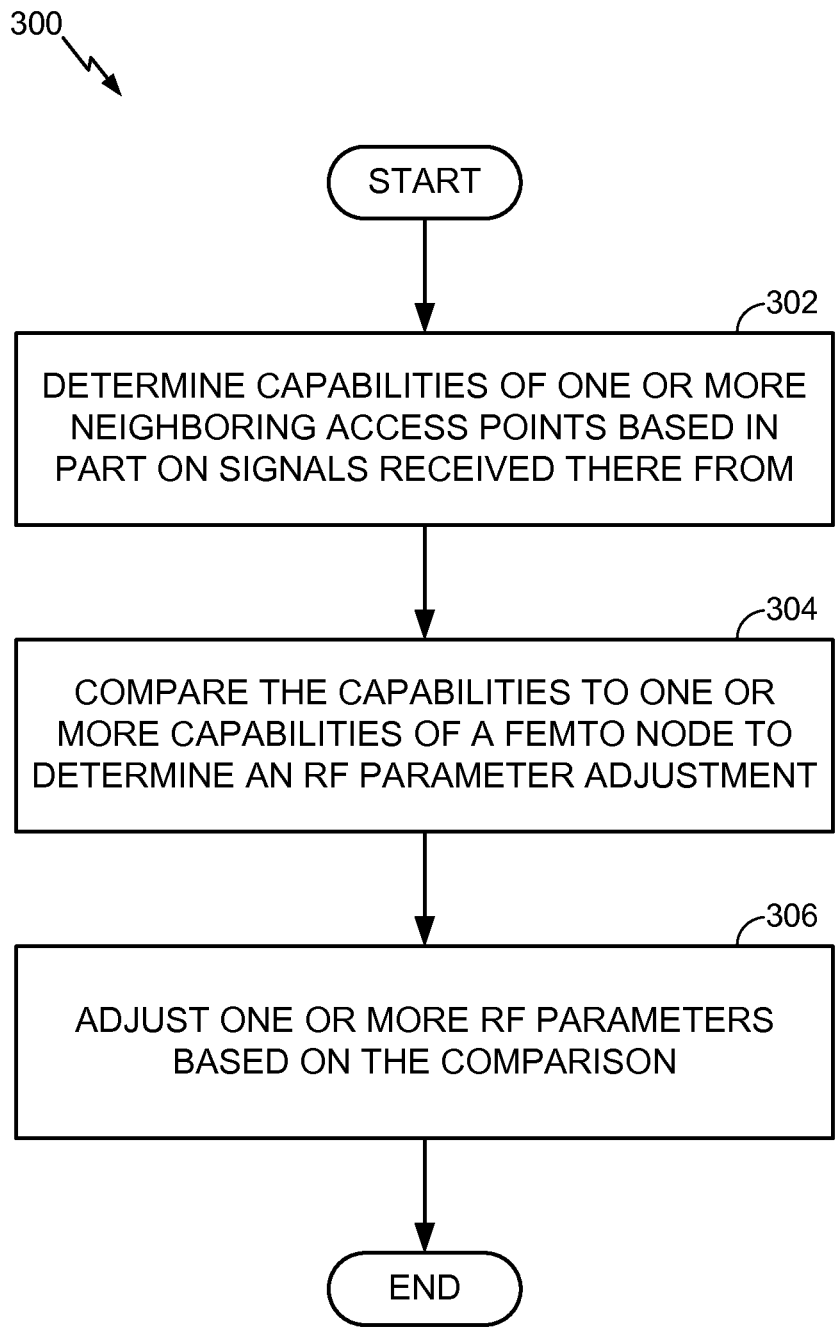
FIG. 3 is a flow chart of an aspect of an example methodology for adjusting RF parameters of a femto node.

Referring to FIG. 3, an example methodology relating to adjusting RF parameters of femto nodes to set a coverage area is illustrated. While, for purposes of simplicity of explanation, methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 3, an example methodology 300 is displayed that facilitates adjusting RF parameters of a femto node.

At 302, capabilities of one or more neighboring access points (e.g., neighboring femto or pico nodes) can be determined based in part on signals received therefrom. For example, the capabilities can relate to a number of channel elements, a backhaul capacity or cost, a maximum transmission power, an average downlink or uplink load, or an access mode of the one or more neighboring access points as received in a broadcast message from the one or more neighboring access points, and/or the like. Moreover, the determining can comprise receiving information regarding the capabilities over a BCH or backhaul connection, determining the capabilities based on information received over the BCH, inferring capabilities based on mapping one or more received physical layer attributes, such as a PSC, to possible capability parameters, and/or the like.

At 304, the capabilities can be compared to one or more capabilities of the femto node to determine an RF parameter adjustment for the femto node. For example, this can include determining whether the capabilities are better or worse than those determined for the one or more neighboring access points. Where the capabilities are better for the one or more neighboring access points, for example, the RF parameter adjustment can relate to lowering RF parameters to effectively shrink a coverage area of the femto node, such that devices can more often prefer the one or more neighboring access points. Thus, user experience may be improved and better optimized. Where the capabilities of the femto node are better than the neighboring access points, however, the RF parameters can be modified to increase coverage area of the femto node. For example, the RF parameters can relate to a transmission power, resource allocation, frequency spectrum, etc. for the femto node.

At 306, one or more RF parameters can be adjusted based on the comparison, as described. For example, the RF parameter adjustment can be absolute or relative to current values for the one or more RF parameters. The RF parameter can be adjusted at the femto node to effectuate modification of the coverage area.

It will be appreciated that, in accordance with one or more aspects described herein, inferences can be made regarding determining capabilities of neighboring access points, determining a corresponding RF parameter adjustment, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 4:
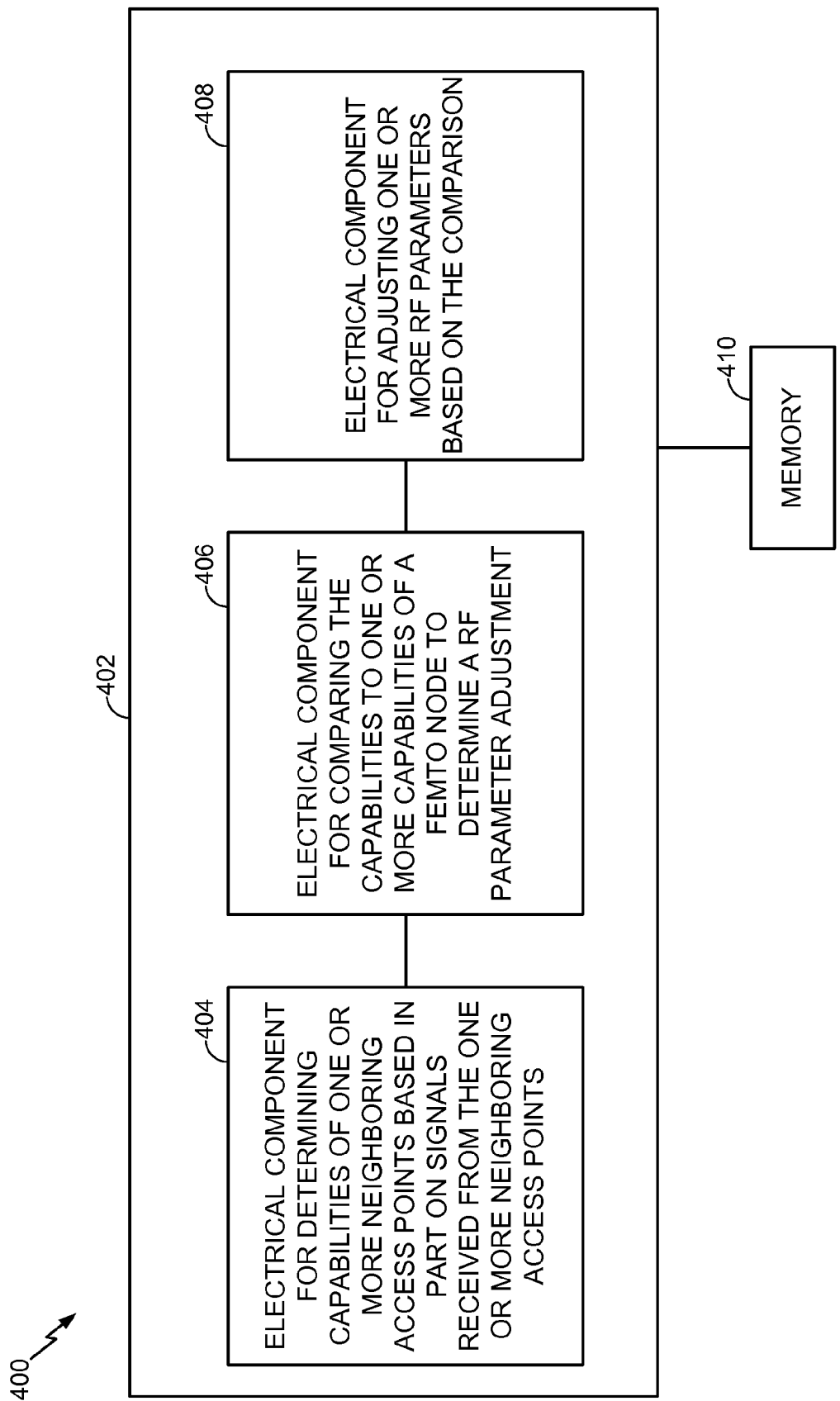
FIG. 4 is a block diagram of an example system that adjusts RF parameters of a femto node.

With reference to FIG. 4, illustrated is a system 400 for expanding coverage area of a femto node. For example, system 400 can reside at least partially within a femto node. It is to be appreciated that system 400 is represented as including functional blocks, which can be functional blocks that represent functions implemented by a processor, software, or combination thereof (e.g., firmware). System 400 includes a logical grouping 402 of electrical components that can act in conjunction. For instance, logical grouping 402 can include an electrical component for determining capabilities of one or more neighboring access points (e.g., femto or pico nodes) based in part on signals received from the one or more neighboring access points 404. Further, logical grouping 402 can comprise an electrical component for comparing the capabilities to one or more capabilities of a femto node to determine an RF parameter adjustment 406.

Further, logical grouping 402 can include an electrical component for adjusting one or more RF parameters based on the comparison. As described, RF parameters may be adjusted to prefer the femto node or the one or more access points by expanding or shrinking a coverage area of the femto node based on comparison of the capabilities, etc. For example, electrical components 404 and 406 can include a capability determining component 210, as described above. In addition, for example, electrical component 408, in an aspect, can include a parameter adjusting component 212, as described above.

Additionally, system 400 can include a memory 410 that retains instructions for executing functions associated with the electrical components 404, 406, and 408. While shown as being external to memory 410, it is to be understood that one or more of the electrical components 404, 406, and 408 can exist within memory 410. In one example, electrical components 404, 406, and 408 can comprise at least one processor, or each electrical component 404, 406, and 408 can be a corresponding module of at least one processor. Moreover, in an additional or alternative example, electrical components 404, 406, and 408 can be a computer program product comprising a computer readable medium, where each electrical component 404, 406, and 408 can be corresponding code.

Figure 5:
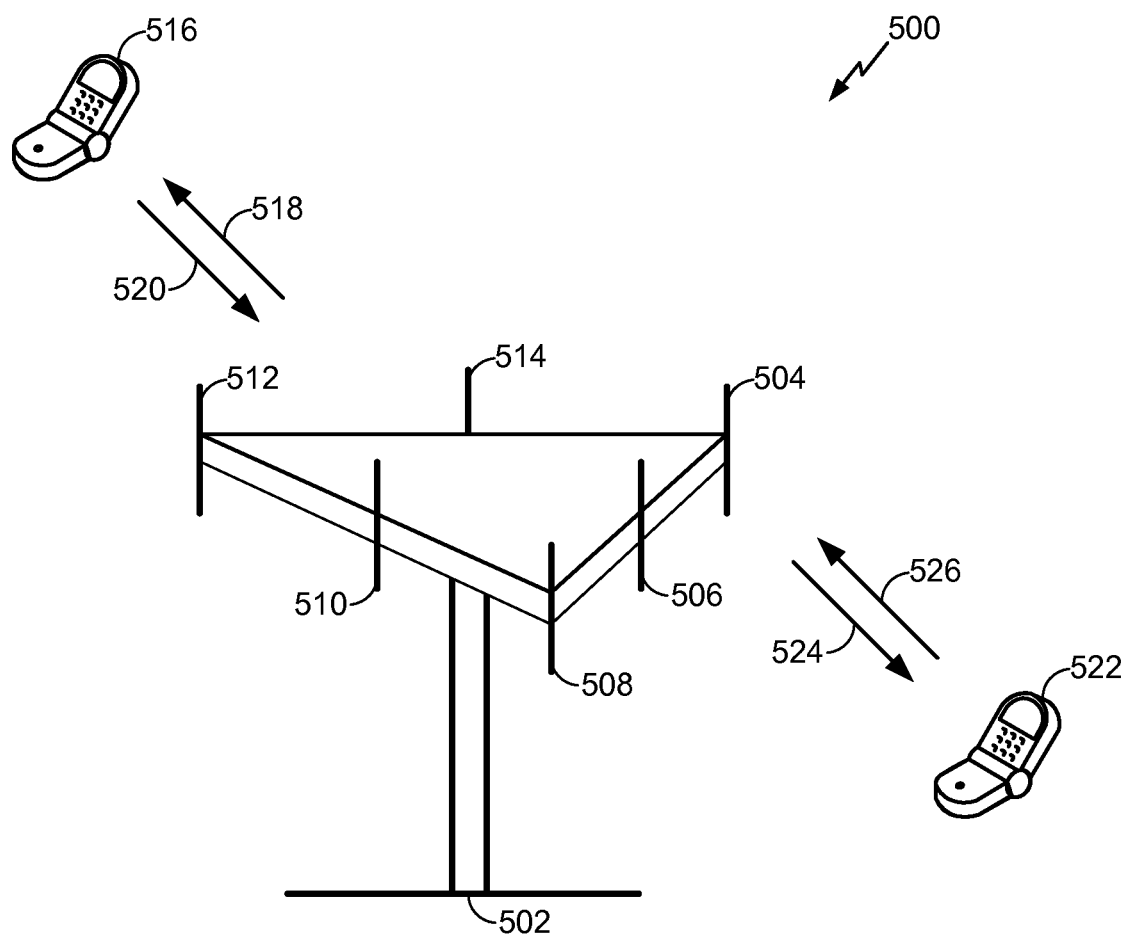
FIG. 5 is a block diagram of an example wireless communication system in accordance with various aspects set forth herein.

Referring now to FIG. 5, a wireless communication system 500 is illustrated in accordance with various embodiments presented herein. System 500 comprises a base station 502 that can include multiple antenna groups. For example, one antenna group can include antennas 504 and 506, another group can comprise antennas 508 and 510, and an additional group can include antennas 512 and 514. Two antennas are illustrated for each antenna group; however, more or fewer antennas can be utilized for each group. Base station 502 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated.

Base station 502 can communicate with one or more mobile devices such as mobile device 516 and mobile device 522; however, it is to be appreciated that base station 502 can communicate with substantially any number of mobile devices similar to mobile devices 516 and 522. Mobile devices 516 and 522 can be, for example, cellular phones, smart phones, laptops, handheld communication devices, handheld computing devices, satellite radios, global positioning systems, PDAs, and/or any other suitable device for communicating over wireless communication system 500. As depicted, mobile device 516 is in communication with antennas 512 and 514, where antennas 512 and 514 transmit information to mobile device 516 over a forward link 518 and receive information from mobile device 516 over a reverse link 520. Moreover, mobile device 522 is in communication with antennas 504 and 506, where antennas 504 and 506 transmit information to mobile device 522 over a forward link 524 and receive information from mobile device 522 over a reverse link 526. In a frequency division duplex (FDD) system, forward link 518 can utilize a different frequency band than that used by reverse link 520, and forward link 524 can employ a different frequency band than that employed by reverse link 526, for example. Further, in a time division duplex (TDD) system, forward link 518 and reverse link 520 can utilize a common frequency band and forward link 524 and reverse link 526 can utilize a common frequency band.

Each group of antennas and/or the area in which they are designated to communicate can be referred to as a sector of base station 502. For example, antenna groups can be designed to communicate to mobile devices in a sector of the areas covered by base station 502. In communication over forward links 518 and 524, the transmitting antennas of base station 502 can utilize beamforming to improve signal-to-noise ratio of forward links 518 and 524 for mobile devices 516 and 522. Also, while base station 502 utilizes beamforming to transmit to mobile devices 516 and 522 scattered randomly through an associated coverage, mobile devices in neighboring cells can be subject to less interference as compared to a base station transmitting through a single antenna to all its mobile devices. Moreover, mobile devices 516 and 522 can communicate directly with one another using a peer-to-peer or ad hoc technology as described. According to an example, system 500 can be a multiple-input multiple-output (MIMO) communication system.

Figure 6:
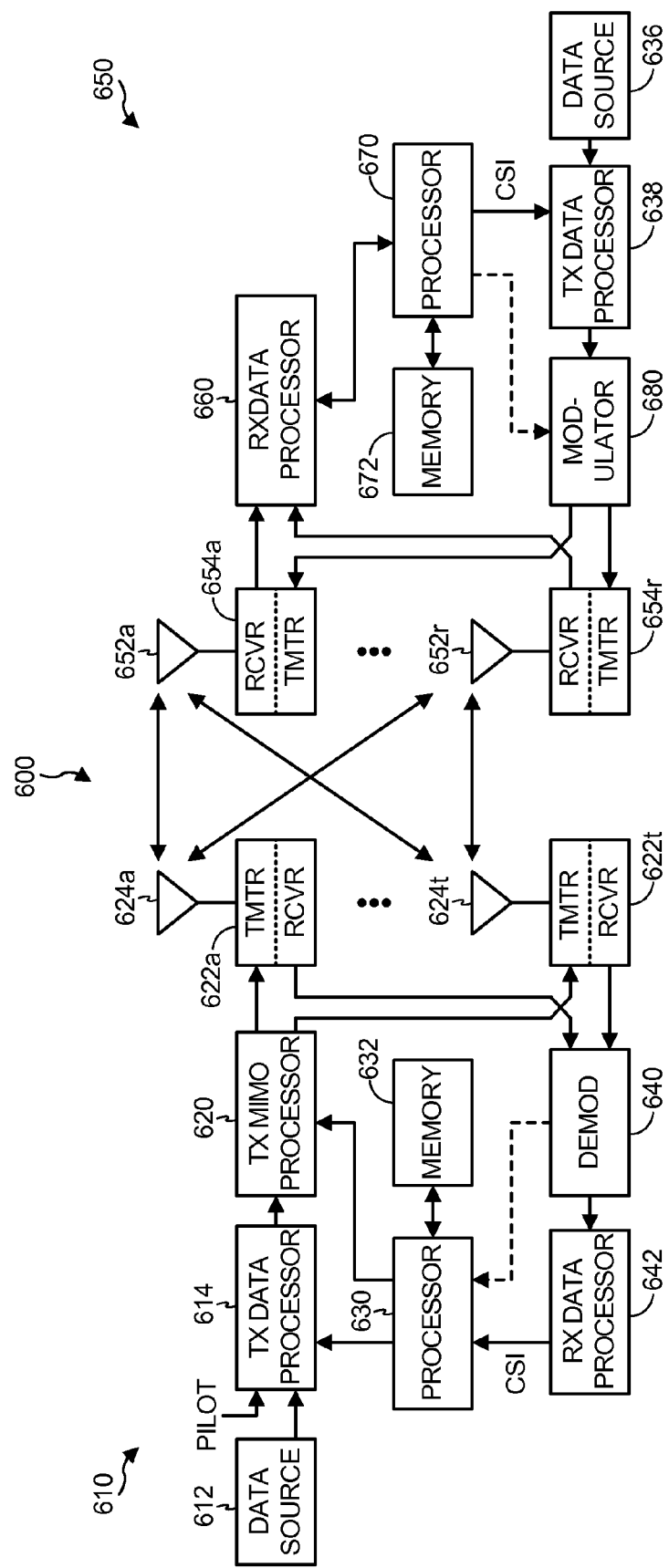
FIG. 6 is an illustration of an example wireless network environment that can be employed in conjunction with the various systems and methods described herein.

FIG. 6 shows an example wireless communication system 600. The wireless communication system 600 depicts one base station 610, which can include a femto node, and one mobile device 650 for sake of brevity. However, it is to be appreciated that system 600 can include more than one base station and/or more than one mobile device, wherein additional base stations and/or mobile devices can be substantially similar or different from example base station 610 and mobile device 650 described below. In addition, it is to be appreciated that base station 610 and/or mobile device 650 can employ the systems (FIGS. 1, 2, 4, and 5) and/or methods (FIG. 3) described herein to facilitate wireless communication therebetween. For example, components or functions of the systems and/or methods described herein can be part of a memory 632 and/or 672 or processors 630 and/or 670 described below, and/or can be executed by processors 630 and/or 670 to perform the disclosed functions.

At base station 610, traffic data for a number of data streams is provided from a data source 612 to a transmit (TX) data processor 614. According to an example, each data stream can be transmitted over a respective antenna. TX data processor 614 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 650 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 630.

The modulation symbols for the data streams can be provided to a TX MIMO processor 620, which can further process the modulation symbols (e.g., for OFDM). TX MIMO processor 620 then provides NT modulation symbol streams to NT transmitters (TMTR) 622a through 622t. In various embodiments, TX MIMO processor 620 applies beamforming weights to the symbols of the data streams and to the antenna from which the symbol is being transmitted.

Each transmitter 622 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 622a through 622t are transmitted from NT antennas 624a through 624t, respectively.

At mobile device 650, the transmitted modulated signals are received by NR antennas 652a through 652r and the received signal from each antenna 652 is provided to a respective receiver (RCVR) 654a through 654r. Each receiver 654 conditions (e.g., filters, amplifies, and downconverts) a respective signal, digitizes the conditioned signal to provide samples, and further processes the samples to provide a corresponding "received" symbol stream.

An RX data processor 660 can receive and process the NR received symbol streams from NR receivers 654 based on a particular receiver processing technique to provide NT "detected" symbol streams. RX data processor 660 can demodulate, deinterleave, and decode each detected symbol stream to recover the traffic data for the data stream. The processing by RX data processor 660 is complementary to that performed by TX MIMO processor 620 and TX data processor 614 at base station 610.

The reverse link message can comprise various types of information regarding the communication link and/or the received data stream. The reverse link message can be processed by a TX data processor 638, which also receives traffic data for a number of data streams from a data source 636, modulated by a modulator 680, conditioned by transmitters 654a through 654r, and transmitted back to base station 610.

At base station 610, the modulated signals from mobile device 650 are received by antennas 624, conditioned by receivers 622, demodulated by a demodulator 640, and processed by a RX data processor 642 to extract the reverse link message transmitted by mobile device 650. Further, processor 630 can process the extracted message to determine which precoding matrix to use for determining the beamforming weights.

Processors 630 and 670 can direct (e.g., control, coordinate, manage, etc.) operation at base station 610 and mobile device 650, respectively. Respective processors 630 and 670 can be associated with memory 632 and 672 that store program codes and data. Processors 630 and 670 can also perform functionalities described herein to support adjusting RF parameters of one or more femto nodes.

Figure 7:
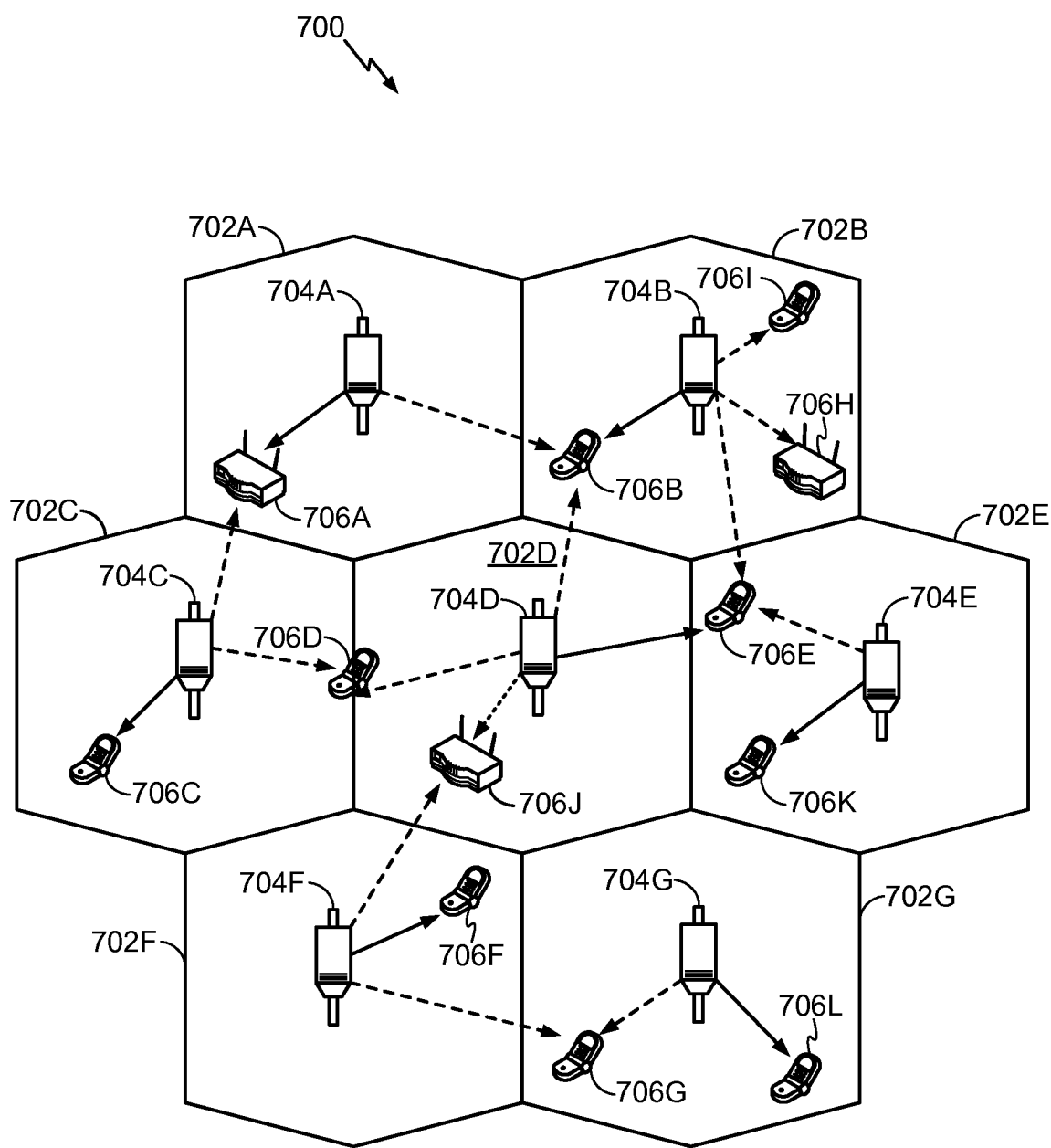
FIG. 7 illustrates an example wireless communication system, configured to support a number of devices, in which the aspects herein can be implemented.

FIG. 7 illustrates a wireless communication system 700, configured to support a number of users, in which the embodiments and teachings herein may be implemented. The system 700 provides communication for multiple cells 702, such as, for example, macro cells 702A-702G, with each cell being serviced by a corresponding access node 704 (e.g., access nodes 704A-704G). As shown in FIG. 7, access terminals 706 (e.g., access terminals 706A-706L) can be dispersed at various locations throughout the system over time. Each access terminal 706 can communicate with one or more access nodes 704 on a forward link (FL) and/or a reverse link (RL) at a given moment, depending upon whether the access terminal 706 is active and whether it is in soft handoff, for example. The wireless communication system 700 can provide service over a large geographic region.

Figure 8:
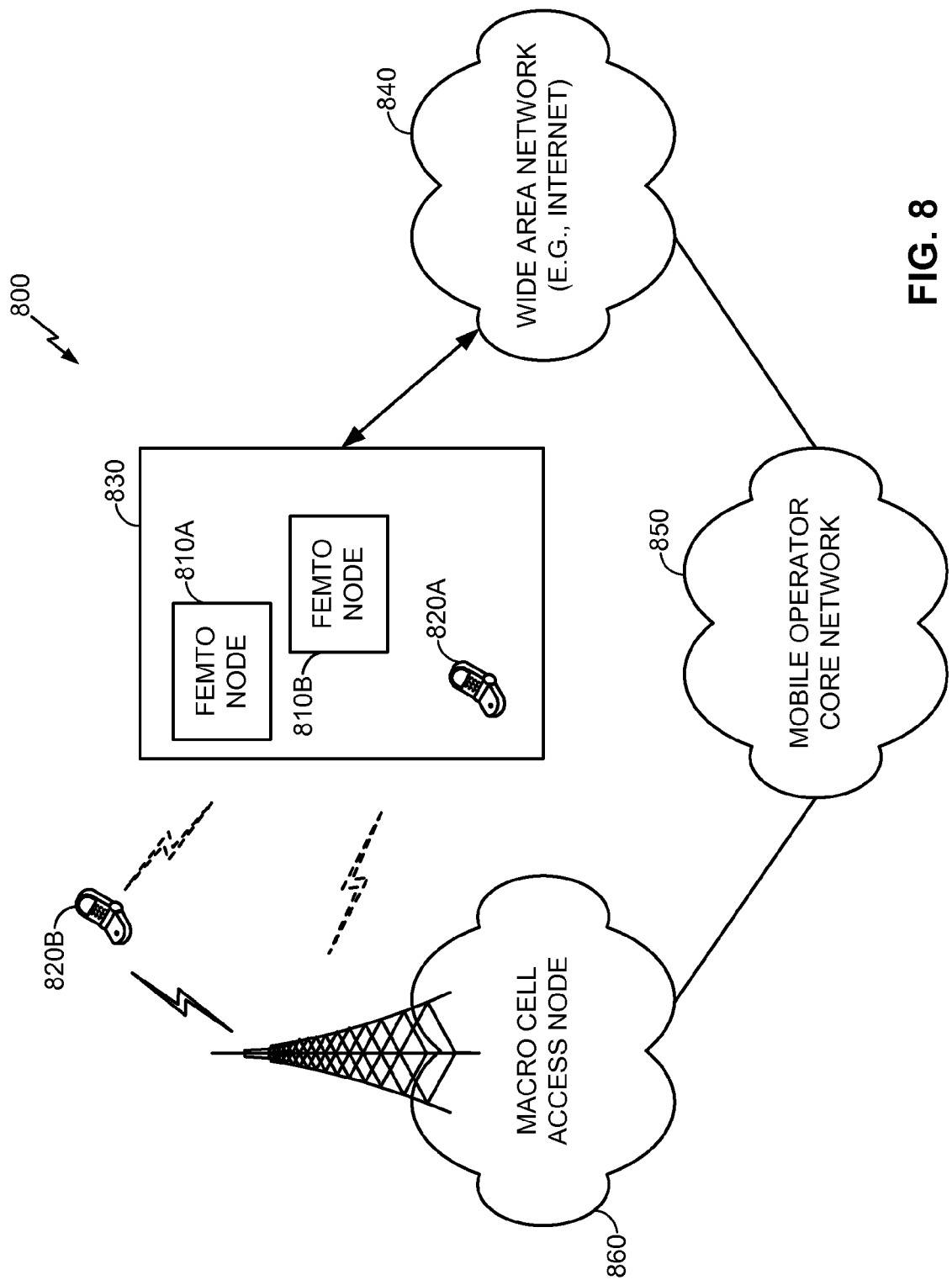
FIG. 8 is an illustration of an exemplary communication system to enable deployment of femto nodes within a network environment.

FIG. 8 illustrates an exemplary communication system 800 where one or more femto nodes are deployed within a network environment. Specifically, the system 800 includes multiple femto nodes 810A and 810B (e.g., femtocell nodes or H(e)NB) installed in a relatively small scale network environment (e.g., in one or more user residences 830). Each femto node 810 can be coupled to a wide area network 840 (e.g., the Internet) and a mobile operator core network 850 via a digital subscriber line (DSL) router, a cable modem, a wireless link, or other connectivity means (not shown). As will be discussed below, each femto node 810 can be configured to serve associated access terminals 820 (e.g., access terminal 820A) and, optionally, alien access terminals 820 (e.g., access terminal 820B). In other words, access to femto nodes 810 can be restricted such that a given access terminal 820 can be served by a set of designated (e.g., home) femto node(s) 810 but may not be served by any non-designated femto nodes 810 (e.g., a neighbor's femto node).

Figure 9:
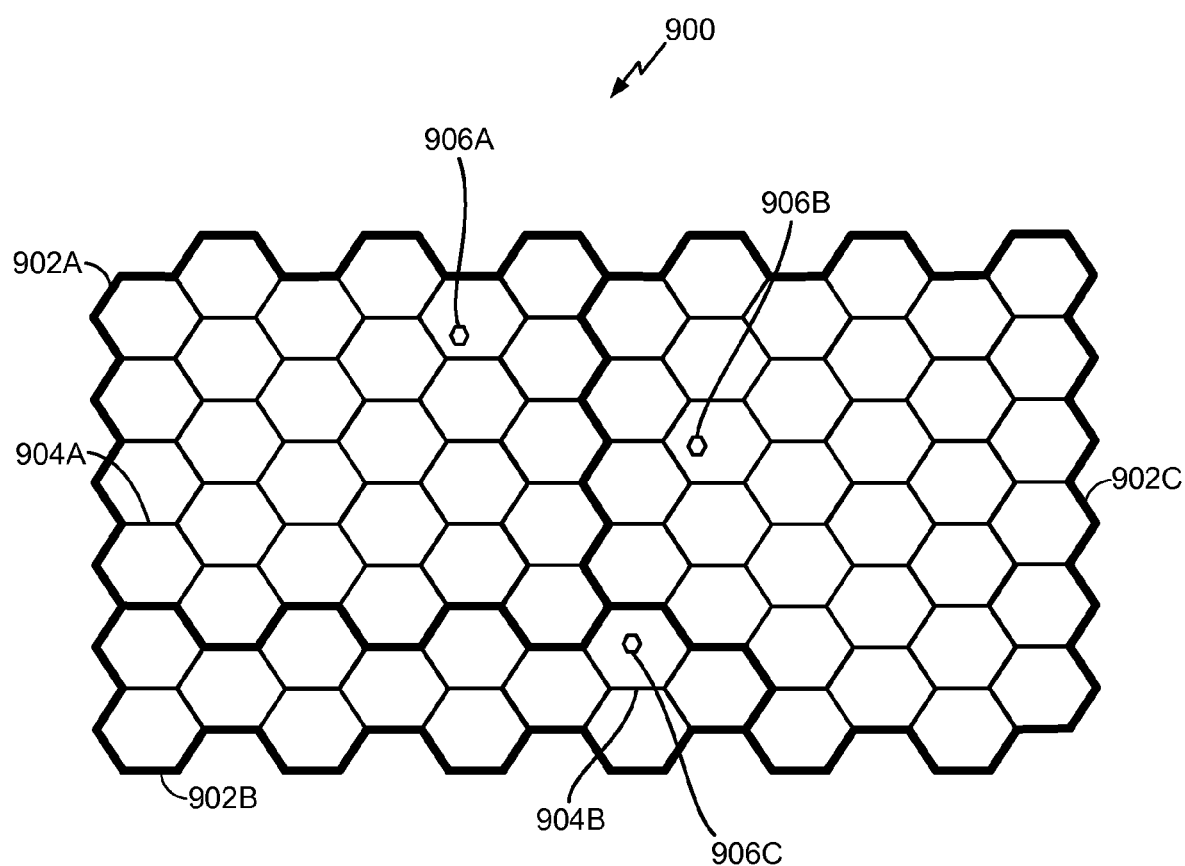
FIG. 9 illustrates an example of a coverage map having several defined tracking areas.

FIG. 9 illustrates an example of a coverage map 900 where several tracking areas 902 (or routing areas or location areas) are defined, each of which includes several macro coverage areas 904. Here, areas of coverage associated with tracking areas 902A, 902B, and 902C are delineated by the wide lines and the macro coverage areas 904 (e.g., 904A and 904B) are represented by the hexagons. The tracking areas 902 also include femto coverage areas 906 (e.g., 906A, 906B, and 906C). In this example, each of the femto coverage areas 906 (e.g., femto coverage area 906C) is depicted within a macro coverage area 904 (e.g., macro coverage area 904B). It should be appreciated, however, that a femto coverage area 906 may not lie entirely within a macro coverage area 904. In practice, a large number of femto coverage areas 906 can be defined with a given tracking area 902 or macro coverage area 904. Also, one or more pico coverage areas (not shown) can be defined within a given tracking area 902 or macro coverage area 904.

Referring again to FIG. 8, the owner of a femto node 810 can subscribe to mobile service, such as, for example, 3G mobile service, offered through the mobile operator core network 850. In another example, the femto node 810 can be operated by the mobile operator core network 850 to expand coverage of the wireless network. In addition, an access terminal 820 can be capable of operating both in macro environments and in smaller scale (e.g., residential) network environments. Thus, for example, depending on the current location of the access terminal 820, the access terminal 820 can be served by a macro cell access node 860 or by any one of a set of femto nodes 810 (e.g., the femto nodes 810A and 810B that reside within a corresponding user residence 830). For example, when a subscriber is outside his home, he is served by a standard macro cell access node (e.g., node 860) and when the subscriber is at home, he is served by a femto node (e.g., node 810A). Here, it should be appreciated that a femto node 810 can be backward compatible with existing access terminals 820.

A femto node 810 can be deployed on a single frequency or, in the alternative, on multiple frequencies. Depending on the particular configuration, the single frequency or one or more of the multiple frequencies can overlap with one or more frequencies used by a macro cell access node (e.g., node 860). In some aspects, an access terminal 820 can be configured to connect to a preferred femto node (e.g., the home femto node of the access terminal 820) whenever such connectivity is possible. For example, whenever the access terminal 820 is within the user's residence 830, it can communicate with the home femto node 810.

In some aspects, if the access terminal 820 operates within the mobile operator core network 850 but is not residing on its most preferred network (e.g., as defined in a preferred roaming list), the access terminal 820 can continue to search for the most preferred network (e.g., femto node 810) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 820 can limit the search for specific band and channel. For example, the search for the most preferred system can be repeated periodically. Upon discovery of a preferred femto node, such as femto node 810, the access terminal 820 selects the femto node 810 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 810 that reside within the corresponding user residence 830). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that is authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on. Accordingly, unless indicated otherwise in its particular context, the term femto node as used herein is generally intended to cover such pico nodes and other low power base stations, as described above.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for a femto node to configure one or more of its radio frequency (RF) parameters, comprising:
   determining one or more capabilities of one or more neighboring femto or pico nodes based in part on signals received from the one or more neighboring femto or pico nodes, wherein the one or more capabilities comprise a number of channel elements, a backhaul capacity or cost, a total transmission power, a downlink or uplink load metric, a preferred user type, an access mode, or a combination thereof;
   comparing the determined one or more capabilities of the one or more neighboring femto or pico nodes to one or more capabilities of the femto node; and
   adjusting one or more RF parameters for controlling transmission of the femto node based on the comparison improving a chance for an associated user equipment (UE) to handover to or reselect one of the one or more neighboring femto or pico nodes when the one of the one or more neighboring femto or pico nodes has capabilities above a threshold.

2. The method of claim 1, wherein the one or more capabilities of the one or more neighboring femto or pico nodes are determined based in part on a physical layer attribute transmitted by the one or more neighboring femto or pico nodes.

3. The method of claim 1, wherein the one or more capabilities of the one or more neighboring femto or pico nodes are determined based in part on a broadcast message received from the one or more neighboring femto or pico nodes.

4. The method of claim 1, wherein the one or more capabilities of the one or more neighboring femto or pico nodes are determined based in part on a message received from the one or more neighboring femto or pico nodes over a backhaul connection therewith.

5. The method of claim 1, wherein the one or more capabilities of the one or more neighboring femto or pico nodes are determined based in part on a message received through the associated UE.

6. The method of claim 1, wherein adjusting the one or more RF parameters comprises adjusting a transmission power, a resource allocation, or a frequency spectrum of the femto node.

7. The method of claim 1, further comprising communicating the one or more capabilities of the femto node to at least a portion of the one or more neighboring femto or pico nodes.

8. The method of claim 1, wherein the one or more capabilities comprise the number of channel elements, the backhaul capacity or cost, the preferred user type, the access mode, or a combination thereof.

9. An apparatus for configuring one or more radio frequency (RF) parameters of a femto node, comprising:
   at least one processor configured to:
      determine one or more capabilities of one or more neighboring femto or pico nodes based in part on signals received from the one or more neighboring femto or pico nodes, wherein the one or more capabilities comprise a number of channel elements, a backhaul capacity or cost, a total transmission power, a downlink or uplink load metric, a preferred user type, an access mode, or a combination thereof,
      compare the determined one or more capabilities of the one or more neighboring femto or pico nodes to one or more capabilities of the femto node, and
      adjust one or more RF parameters for controlling transmission of the femto node based on the comparison improving a chance for an associated user equipment (UE) to handover to or reselect one of the one or more neighboring femto or pico nodes when the one of the one or more neighboring femto or pico nodes has capabilities above a threshold; and
   memory coupled to the at least one processor.

10. The apparatus of claim 9, wherein the at least one processor is configured to determine the one or more capabilities of the one or more neighboring femto or pico nodes based in part on a physical layer attribute transmitted by the one or more neighboring femto or pico nodes.

11. The apparatus of claim 9, wherein the at least one processor is configured to determine the one or more capabilities of the one or more neighboring femto or pico nodes based in part on a broadcast message received from the one or more neighboring femto or pico nodes.

12. The apparatus of claim 9, wherein the at least one processor is configured to determine the one or more capabilities of the one or more neighboring femto or pico nodes based in part on a message received from the one or more neighboring femto or pico nodes over a backhaul connection therewith.

13. The apparatus of claim 9, wherein the at least one processor is configured to determine the one or more capabilities of the one or more neighboring femto or pico nodes based in part on a message received through the associated UE.

14. The apparatus of claim 9, wherein the at least one processor is configured to adjust the one or more RF parameters by adjusting a transmission power, a resource allocation, or a frequency spectrum of the femto node.

15. The apparatus of claim 9, wherein the at least one processor is further configured to communicate the one or more capabilities of the femto node to at least a portion of the one or more neighboring femto or pico nodes.

16. The apparatus of claim 9, wherein the one or more capabilities comprise the number of channel elements, the backhaul capacity or cost, the preferred user type, the access mode, or a combination thereof.

17. An apparatus for configuring one or more radio frequency (RF) parameters of a femto node, comprising:
   means for determining one or more capabilities of one or more neighboring femto or pico nodes based in part on signals received from the one or more neighboring femto or pico nodes, wherein the one or more capabilities comprise a number of channel elements, a backhaul capacity or cost, a total transmission power, a downlink or uplink load metric, a preferred user type, an access mode, or a combination thereof;
   means for comparing the determined one or more capabilities of the one or more neighboring femto or pico nodes to one or more capabilities of the femto node; and
   means for adjusting one or more RF parameters for controlling transmission of the femto node based on the comparison improving a chance for an associated user equipment (UE) to handover to or reselect one of the one or more neighboring femto or pico nodes when the one of the one or more neighboring femto or pico nodes has capabilities above a threshold.

18. The apparatus of claim 17, wherein the means for determining comprises means for determining the one or more capabilities of the one or more neighboring femto or pico nodes based in part on a physical layer attribute transmitted by the one or more neighboring femto or pico nodes.

19. The apparatus of claim 17, wherein the means for determining comprises means for determining the one or more capabilities of the one or more neighboring femto or pico nodes based in part on a broadcast message received from the one or more neighboring femto or pico nodes.

20. The apparatus of claim 17, wherein the means for determining comprises means for determining the one or more capabilities of the one or more neighboring femto or pico nodes based in part on a message received from the one or more neighboring femto or pico nodes over a backhaul connection therewith.

21. The apparatus of claim 17, wherein the means for determining comprises means for determining the one or more capabilities of the one or more neighboring femto or pico nodes based in part on a message received through the associated UE.

22. The apparatus of claim 17, wherein the means for adjusting the one or more RF parameters comprises means for adjusting a transmission power, a resource allocation, or a frequency spectrum of the femto node.

23. The apparatus of claim 17, further comprising means for communicating the one or more capabilities of the femto node to at least a portion of the one or more neighboring femto or pico nodes.

24. The apparatus of claim 17, wherein the one or more capabilities comprise the number of channel elements, the backhaul capacity or cost, the preferred user type, the access mode, or a combination thereof.

25. A non-transitory computer-readable medium comprising code, which, when executed by at least one processor, causes the at least one processor to perform operations for a femto node to configure one or more of its radio frequency (RF) parameters, the non-transitory computer-readable medium comprising:
   code for determining one or more capabilities of one or more neighboring femto or pico nodes based in part on signals received from the one or more neighboring femto or pico nodes, wherein the one or more capabilities comprise a number of channel elements, a backhaul capacity or cost, a total transmission power, a downlink or uplink load metric, a preferred user type, an access mode, or a combination thereof;
   code for comparing the determined one or more capabilities of the one or more neighboring femto or pico nodes to one or more capabilities of the femto node; and
   code for adjusting one or more RF parameters for controlling transmission of the femto node based on the comparison improving a chance for an associated user equipment (UE) to handover to or reselect one of the one or more neighboring femto or pico nodes when the one of the one or more neighboring femto or pico nodes has capabilities above a threshold.

26. The non-transitory computer-readable medium of claim 25, wherein the code for determining comprises code for determining the one or more capabilities of the one or more neighboring femto or pico nodes based in part on a physical layer attribute transmitted by the one or more neighboring femto or pico nodes.

27. The non-transitory computer-readable medium of claim 25, wherein the code for determining comprises code for determining the one or more capabilities of the one or more neighboring femto or pico nodes based in part on a broadcast message received from the one or more neighboring femto or pico nodes.

28. The non-transitory computer-readable medium of claim 25, wherein the code for determining comprises code for determining the one or more capabilities of the one or more neighboring femto or pico nodes based in part on a message received from the one or more neighboring femto or pico nodes over a backhaul connection therewith.

29. The non-transitory computer-readable medium of claim 25, wherein the code for determining comprises code for determining the one or more capabilities of the one or more neighboring femto or pico nodes based in part on a message received through the associated UE.

30. The non-transitory computer-readable medium of claim 25, wherein the code for adjusting the one or more RF parameters comprises code for adjusting a transmission power, a resource allocation, or a frequency spectrum of the femto node.

31. The non-transitory computer-readable medium of claim 25, further comprising code for communicating the one or more capabilities of the femto node to at least a portion of the one or more neighboring femto or pico nodes.

32. The non-transitory computer-readable medium of claim 25, wherein the one or more capabilities comprise the number of channel elements, the backhaul capacity or cost, the preferred user type, the access mode, or a combination thereof.

* * * * *